May 19, 1942.  J. MacMANUS  2,283,380
PACKAGED CAKE
Original Filed Feb. 13, 1939

INVENTOR.
John Mac Manus
BY
Cooper, Kerr & Dunham
ATTORNEYS

Patented May 19, 1942

2,283,380

UNITED STATES PATENT OFFICE 2,283,380

PACKAGED CAKE

John MacManus, Yonkers, N. Y., assignor to Cushman's Sons Inc., New York, N. Y., a corporation of New York Original application February 13, 1939, Serial No. 256,121. Divided and this application June 5, 1939, Serial No. 277,415

4 Claims. (Cl. 99—171)

This invention relates to packaged cakes, particularly layer cakes, and in the containers in which they are to be handled, shipped and displayed. This application is a division of my co-pending application, Serial No. 256,121 filed February 13, 1939, for Method of finishing cake, patented November 12, 1940, as United States Patent No. 2,220,971.

In finishing layer cake, after the layers have been baked, it is customary to put filling and icing between the layers and on top of the cake respectively. The filling and icing may be of the same or different material. It is often desirable, especially in summer, to omit putting the icing or frosting on the cylindrical sides thereof because of its tendency to run. If the icing on the sides of the cage runs, it will be appreciated that the heat appearance is spoiled and hence the cake becomes unsalable. Another advantage of omitting icing or frosting on the sides is that the cake itself as well as the filling between the layers may be seen by the purchaser.

One object of my invention is to build a plurality of cake layers in a container, preferably made of transparent material, placing one layer on top of another with filling material between, and icing off the top of the completed cake; during the operation of spreading the filling between the layers, and the icing on top of the cake, the collar or container prevents the filling and icing from being pushed over onto the sides and it keeps the perimeter of the layers of icing and filling sharp and well defined. This adds greatly to the neatness and hence salability of the product. When the cake is built up without any collar or container it takes even a skilled baker longer to get the filling or icing to the same transverse dimensions of the layers. The shaping of the filling and icing is easily and more quickly accomplished even by unskilled workers when done in my collar or container.

After the cake has been built up and finished, the collar has the further advantage of protecting the cake from dust, moisture or dryness when it is handled, shipped and displayed to the customer. The collar or container, which can be easily slipped off when desired, may be made of a transparent material; this gives the further advantage that the purchaser may view the cake material and filling.

Figure 1:
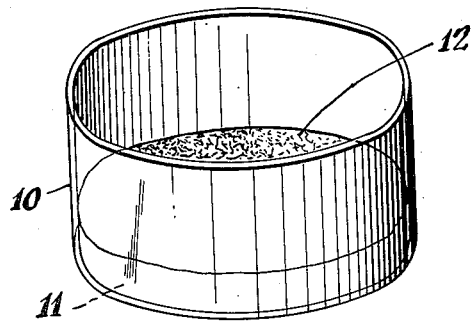
Fig. 1 is a tilted view of a transparent container or collar showing the bottom layer inserted but before any filling has been spread on the top thereof.

In the drawing, 10 is the cylindrical collar or container preferably made of flexible transparent material but my invention is not so limited for I contemplate using material which is inflexible or opaque as well. The material of the collar should however, be of such a stiffness that the collar will not collapse while the cake is being built up and finished within, in the manner hereinafter described.

Figure 2:
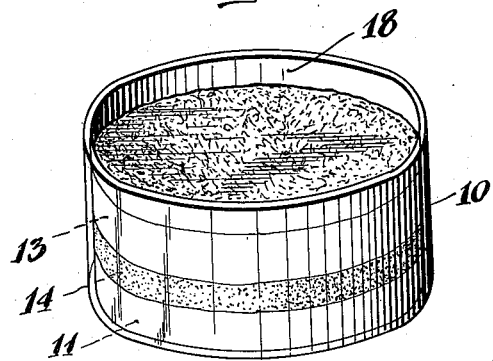
Fig. 2 is the same as Fig. 1 except that the filling has been spread on the top of the bottom layer and top layer has been inserted but no icing or frosting has been spread on the top of the cake.
Figure 3:
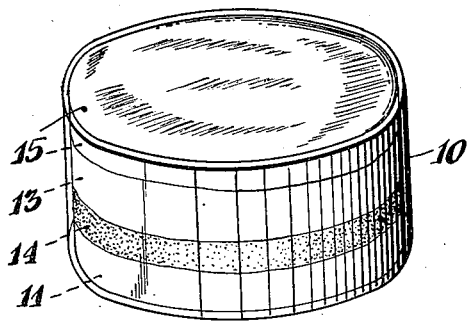
Fig. 3 is the same as Fig. 2 except that the icing or frosting has been spread on the top of the top layer.

In finishing the cake, a previously baked lower layer 11, which is cylindrical in shape, is inserted into the collar 10 from the top and slid down so that its bottom surface is approximately flush with the bottom of the collar. The layer should be of such a diameter that it will fit fairly snugly into the surrounding collar 10 for the latter acts as a shipping and handling container as well as for the function now to be described; however, the fit should not be too snug for when the cake is wanted for use it must be slid out of the surrounding collar. On the top 12 of bottom layer 11, filling 14 is spread as shown in Fig. 2. The filling may be quickly and evenly spread by an unskilled workman without danger of its being pushed over the edge of layer 11 for it is confined and embraced at its circumferential edge by the surrounding collar 10. In this way the diameter of the filling 14 will be the same as the diameter of the layer 11, giving to the finished cake that neat appearance which is so necessary to make articles of this class salable. After the filling 14 has been spread, another cake layer 13, cylindrical in shape and of the same diameter as bottom layer 11, is inserted in the collar 10 and slid down on top of said filling, leaving a cylindrical space 18 for the frosting or icing as shown in Fig. 2. Thereafter frosting or icing 15 is spread on the top side of layer 13, as shown in Fig. 3, and scraped level with the upper edge of the collar 10, thus completing the cake. If no icing is desired on top the cake, this step may be omitted.

From the above description it is apparent that the completed cake is in the form of a well nigh perfect cylinder. The layers 11 and 13 are baked in cylinders of the same diameter and enclosed in the collar 10 of approximately the same diameter; both the icing 15 and filling 14 are confined and supported by said collar. The surrounding collar gives sharply defined edges to both the icing and filling, which is most desirable for neatness, even when they are spread therein rapidly and by unskilled workmen. In fact it has been found in practice that when cakes are made without icing on the side in the normal manner without any surrounding collar, even with skilled bakers it takes much longer to even approximate the neat appearance which is so quickly and easily obtained by my method of making cakes of this class. The saving of time and expense in finishing layer cakes of this class is immense when many thousands are made at the same time.

After the cake has been completed in the collar as described, it is then shipped and displayed, the collar serving as a container during shipment and later as a display device, if transparent. Furthermore, the collar acts to keep the sides of the layers 11 and 13 and the filling 14 from drying during the period between making and using, while allowing the icing or frosting 15 to harden in the usual manner.

Whenever it is desired to take the cake out of the collar or container 10 the latter is grasped lightly by both hands and shaken and the cake slips out.

Figure 4:
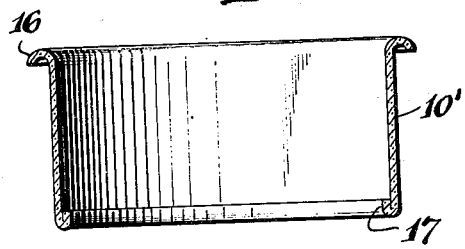
Fig. 4 shows a slightly modified form of the collar or container in sectional elevation.

Fig. 4 shows a modified form of the collar 10 empty. This collar 10' is beaded outwardly at 16 and beaded inwardly at 17. These beadings are not shown in Figs. 1-3 and while not necessary to the practice of my invention yet are in some cases helpful. Top beading 16 is curled outwardly so as not to interfere with the insertion of the layers 11 and 13 and the spreading of icing 15 when the cake is being built up. This beading serves as a grasping ledge when the cake is being shaken out of collar 10' for use. The other or bottom beading 17 is curled inwardly and projects inwardly sufficiently to impede the cake against slipping out of the collar 10' during shipment or ordinary handling. When this lower bead is used, the cake is pushed from the bottom out through the top of the collar. A disc of oiled paper or other suitable material is made to adhere to the bottom of the cake so that pressure can be exerted thereon without spoiling the appearance of the cake. While, as stated, the container or collar may be made of various materials, I have found that transparent Celluloid is quite satisfactory.

Figure 6:
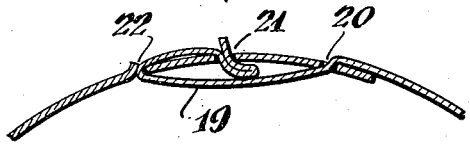
Fig. 6 is a sectional view of the modification shown in Fig. 5 but with the ends of the collar fastened together.
Figure 5:
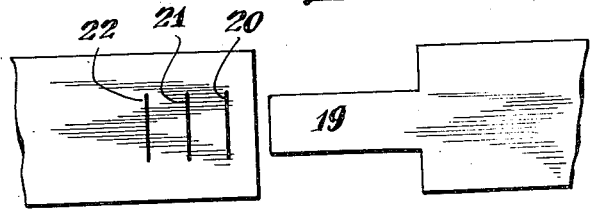
Fig. 5 is a plan view of a further modification showing the collar split and the ends thereof separated.

As a further modification I contemplate that the collar 10 or 10' may be split as shown in Figs. 5 and 6, so that the ends may be separated and the collar removed from the finished cake, instead of sliding the cake out of the collar, as previously described. For fastening the ends of the split collar I provide on one end thereof the tongue 19 which is inserted in slit 20, on the other, from the outside of the collar as shown in Fig. 6 and pulled through, and then threaded from the inside through slit 22 and pulled through. The free end of the tongue 19 is then doubled over and inserted in the slit 21 from the outside thus holding the two ends of the collar together while in use. When it is desired to open the collar for removal, the free end of the loop of tongue 19 is seized and pulled out of slit 21 and the tongue then may be easily slipped out of slits 22 and 20 and the collar removed from the cake. There are other fastenings which are known in other arts by which the ends of the split collar may be held together.

While I have described a layer cake of two layers in height and cylindrical in form, yet I contemplate using my invention in the making of cakes made up of any number of layers and of any shape, such as oval, triangular, square, oblong and the like. I use the words "filling" and "icing" as commonly employed, i. e., filling is the material between layers and icing is the material on top of the upper cake layer.

What I claim is:

1. A packaged multi-layer cake comprising, in combination, superposed layers of ready-baked cake free from foreign edible material on their marginal edges and separated by edible confection which is normally plastic and flowable and all of which layers are coextensive in area, and an imperforate band snugly enclosing the border of the cake and conforming to the edges of said layers, said border-enclosing band having its inside surface in contact with the perimeters of the several layers of the cake and sealing the confection between the ready-baked layers by maintaining the confection from flowing past the peripheral edges of the ready-baked layers and out from its enclosed layer position in the cake, said band being transparent to present to view the sealed-in peripheral edge of the confection layer and enabling inspection of the character of the various layers while the band remains in place.

2. As an article of manufacture, a packaged multi-layer cake comprising superposed layers of ready-baked cake free from foreign edible covering material on their marginal edges, a layer of edible confection intermediate said cake layers which is normally plastic and flowable, said layers of cake and confection being co-extensive in area, and an imperforate band around the cake and conforming to the marginal edges of each of the several layers of cake providing lateral support throughout the height of said cake, the inside surface areas of said cake-enclosing band opposite the several layers of cake being in their entirety in contact with the respective marginal edges of the several layers of cake and thereby sealing the layer of confection intermediate such cake layers and within the projected area of the cake layers, said band being light-transmitting to present to view the several marginal edges of the layers of confection and cake, and means comprising an element extending inwardly from the lower portion of the band for supporting the cake in conjunction with the frictional relationship provided by the snug engagement between said band and the marginal edges of said cake.

3. An article of manufacture as described in claim 2 wherein the top layer of the cake is provided with an icing, said icing having a marginal edge contiguous and flush with respect to the upper edge of said band.

4. An article of manufacture as described in claim 2 having means projecting outwardly from the upper portion of said band to facilitate removal of the band from the cake.

JOHN MacMANUS.